United States Patent [19]

Lewkowicz

[11] Patent Number: 4,731,773
[45] Date of Patent: Mar. 15, 1988

[54] THERMALLY-INDUCED RECORDING WITH REDUCED HARMONIC DISTORTION

[75] Inventor: Julian Lewkowicz, Tucson, Ariz.

[73] Assignee: International Business Machines Corporation, Armonk, N.Y.

[21] Appl. No.: 857,268

[22] Filed: Apr. 30, 1986

Related U.S. Application Data

[63] Continuation-in-part of Ser. No. 749,021, Jun. 26, 1985, abandoned.

[51] Int. Cl.$^4$ ............................................. H04N 5/76
[52] U.S. Cl. ....................................................... 369/59
[58] Field of Search ........................................... 369/59

[56] References Cited

U.S. PATENT DOCUMENTS

| | | | |
|---|---|---|---|
| 4,419,750 | 12/1983 | Howe | 369/116 |
| 4,488,277 | 12/1984 | McFarlane et al. | 369/116 |
| 4,562,567 | 12/1985 | Frankfort et al. | 369/116 |

FOREIGN PATENT DOCUMENTS 116204  8/1984  European Pat. Off.

OTHER PUBLICATIONS

"Research Applies Magnetic Thin Films & the Magnetooptical Effect in Storage Devices"—N. Imamura, JFE, Mar. 1983.

Primary Examiner—Vincent P. Canney
Attorney, Agent, or Firm—Herbert F. Somermeyer

[57] ABSTRACT

An optical information-bearing-signal recorder employs thermally-induced recording of ablative, material movement, material phase change, magneto-optic or similar technologies. Synchronous noise in the recording is reduced by employing a heat-inducing energy pulse, coherent light for example, shaped to have an initial recording-initiating intensity amplitude followed by a recording-sustaining amplitude. The duration of the recording-initiating amplitude portion is constant for all lengths of signals being recorded. When a rotating optical disk is employed as a record-bearing medium, the recording-initiating and recording-sustaining amplitudes are increased with increasing radius of the recording on the disk.

11 Claims, 6 Drawing Figures

THERMALLY-INDUCED RECORDING WITH REDUCED HARMONIC DISTORTION

RELATED APPLICATION

This application is a Continuation-in-Part of Ser. No. 749,021, filed June 26, 1985, now abandoned.

DOCUMENTS INCORPORATED BY REFERENCE (1) EPO Pat. No. 116,204
(2) Japan Electronic Engineering (JEE), March 1983 in an article by Nobutake Imamura entitled "Research Applies Magnetic Thin Films and the Magnetooptical Effect in Storage Devices".

BACKGROUND OF THE INVENTION

1. Field of the Invention

The present invention relates to thermally-induced information-bearing-signal recording which usually is optically sensed; the invention preferably employs lasers and the like for providing the thermal energy to effect the recording.

2. Discussion of the Prior Art

The use of lasers for emitting heat-inducing coherent radiation and E-beams, which are heat-inducing beams commonly used with semiconductors, has been widely practiced in micromachining and signal recording applications. In the micromachining area, harmonic distortion that may be caused by the recording pattern of the thermally-induced recording is of no significance since information-bearing signals are not recorded. On the other hand, when lasers and the like are employed for recording information-bearing signals, the sensing of the recording is sensitive to the quality of the recording; that is, it is desired to maintain as high as possible signal-to-carrier and signal-to-noise ratios. The higher these ratios, the greater the probability of faithfully recording and reproducing information-bearing signals. The problems associated with such recording become acute as the areal densities increase which means that the energy levels in recording and sensing of information-bearing signals are reduced. As a result of the reduced energy levels involved in the recording and read-back, the signal-to-noise ratios are also reduced. Part of the noise is synchronous noise; that is, noise that is induced by either the read-back or recording processes. At relatively modest areal densities, the induced synchronous noise may be tolerated, at higher areal densities such noise is more troublesome. Accordingly, it is an object of the invention to reduce the synchronous noise in thermally-induced recordings.

In the micromachining area, U.S. Pat. No. 4,475,028, McGuire, Jr. et al., shows a multimode constant-potential pulsed welding apparatus having a hot-start feature in which the number of pulses per second is doubled at the beginning of the welding operation. The purpose of the "hot-start" is to facilitate initiating an arc at a lower current level than that provided by a lower-frequency pulsing, i.e., the hot-start, or increased energy, at the beginning of the welding period, is for reliably establishing an arc for welding.

There also has been substantial work in the laser machining of thin films and integrated circuits, as reported in the BELL SYSTEM TECHNICAL JOURNAL; for example, by the article by M. I. Cohen, et al., "Laser Machining of Thin Films and Integrated Circuits", BELL SYSTEM TECHNICAL JOURNAL, March 1978, pp. 385–405. This article teaches the use of solid-state lasers in fabricating tools which provide sharp definition and localized nature of working regions for allowing heating, melting or vaporizing minute amounts of material with minimal effect on adjacent material or components. The article teaches that it is the optical power density in the focused spot at the piece being machined rather than the laser-power output itself that determines the suitability of a laser for removing or ablating material. Further, the size of the affected zone on the target material being machined depends upon the thermal properties of the material as well as the laser beam's spot size and the energy-intensity distribution across the laser-emitted beam. Edge definition of the affected zone depends primarily on thermal properties of the target and the duration of the exposure. Reflectance of the surface of the material being machined may decrease abruptly as the material melts or reacts with the atmosphere, with subsequent laser-beam absorption occurring at greater efficiencies. Initial laser-output energy has to be sufficient to initially break down the surface. The machining taught by this article consists of a sequence of pulses of equal duration, size and shape and of substantially constant amplitude.

In another article, also in the BELL SYSTEM TECHNICAL JOURNAL, by D. Maydan, entitled "Micromachining and Image Recording on Thin Films by Laser Beams", August 1971, pp. 1761–1789, on page 1772, the relationship of the spot-size diameter to the size of the machining area is illustrated, see FIG. 6. An example of micromachining light pulses is shown in FIG. 7 on page 1773 as being light pulses of identical amplitude and of short equal durations. FIG. 8, on page 1774, shows that lines of differing widths may be provided using different laser-intensity outputs. FIG. 9, on page 1775, shows photographs of individual machining spots obtained from the pulsed-laser machining operation. The various pulse shapes used in the machining operations are shown in FIG. 13, page 1780. The use of laser machining using pulses of constant amplitude for video signal recording is shown in FIG. 17 on page 1784.

An article by Cohen, et al., entitled "Application of Lasers to microelectronic Fabrication", published by the New York Academic Press, 1968, in pp. 139–186, is an additional reference showing the effects of a laser beam on material being treated. At page 156, the article teaches that spot size increases with power- or light-intensity levels. Statements on page 164 compare laser welding with fusion welding. Page 167 discusses the effects of pulse duration. This article teaches that, in welding using a pulsed laser, one of the most important parameters to be considered is pulse duration. FIG. 17 on page 168 shows the effect of too long a duration and the resultant effect of the machining operation on the material. The authors state that it is possible to make satisfactory welds over a wide range of pulse durations so long as a minimum time required for adequate heating conduction is provided. While such a parameter is satisfactory for welding, it is certainly not an appropriate approach for high-areal-density information-bearing-signal recording. The authors also discuss the importance of maintaining proper energy control. On page 171, it is stated that the authors have previously suggested that a pulse shape that quickly rises to a peak value and then drops or decays to a lower level may be desirable for welding. This observation apparently is to prevent unintended splatter of the material as may be caused by overheating the area being subjected to a laser beam.

U.S. Pat. No. 3,962,558 to Kocher, et al., shows a pulsed-laser drilling machine having an initial high-energy pulse followed by a sequence of lower-energy pulses. Again, this arrangement is apparently selected to prevent undue splattering of the material being machined. An improvement over the Kocher, et al., patent is shown in U.S. Pat. No. 4,114,018 to Von Allmen, et al., which cites the machining techniques shown in U.S. Pat. No. 3,962,558 in FIG. 2 as well as the amplitude-decaying technique of Cohen, et al., supra, in FIG. 3. Von Allmen, et al., teach, as shown in FIG. 4 of the patent, that an optimum-current amplitude which is substantially constant is the preferable way of laser machining. This stated approach is confirmed by U.S. Pat. No. 4,410,968 to Frohbach, et al., which teaches that, for ablative information-bearing signal recording, the energy level of the recording laser beam should be such as to move the material using constant recording power such as to deform the film of the record-bearing medium for causing local redistribution of the material without vaporizing or splattering the material.

Another form of pulsed-laser recording is shown in U.S. Pat. No. 4,473,829 to Schouhamer Immink, et al., which uses overlapped circular-pulse-shaped beams for producing thermally-induced recordings of diverse lengths on a record-bearing medium. While rapidly pulsing a laser, or similar beam-emitting device, may be appropriate at relatively modest linear recording densities, at higher linear recording densities with a relatively rapidly-moving record-bearing medium, such pulsing can be difficult to achieve, i.e., it is more desirable to turn the laser or other beam-emitting source on and leave it on for the pulse duration. For variable-pulse-length recording operations, by not pulsing the laser, higher linear densities should be achievable. At high density, such overlapped recording pulses also create synchronous noise in the recording.

Pulsed lasers, in addition to ablative or material-redistribution recordings, have also been used for crystalline-to-amorphous phase-change recording. It is not readily apparent that the laser controls for ablative recording would apply to other forms of optical recording. For example, in the article in the IEEE TRANSACTIONS ON ELECTRON DEVICES by Ovshinsky, et al., entitled "Amorphous Semiconductors for Switching, Memory, and Imaging Applications", on pp. 91–105 of Vol. ED-20, No. 2, February 1973, page 97 in FIG. 10 shows electrical impedance characteristics of the amorphous-crystalline switchable material. In particular, there is shown an initial high electrical impedance value once the material has switched phase states; then the electrical impedance level drops as evidenced by the lowered voltage across the material. This article also shows the reversibility of optical effects of amorphous semiconductors that switch between amorphous and crystalline states. The term "semiconductors" is also to be applied to semimetals, which are more commonly used in the phase-change optical recording. Apparently constant current pulses were used in the recording rather than constant power pulses.

Another type of optical recording is the so-called magneto-optic disk such as described by Tsujiyama in ELECTRONICS AND COMMUNICATIONS IN JAPAN, Vol. 60-C, No. 7, 1977, in an article entitled "Magneto-Optical Disk Memory Utilizing Multilenses", on pp. 89–97. This article teaches recording on a magneto-optic record-bearing medium using pulsed lasers having a constant amplitude and shape for generating recording in circular recording areas. In a magneto-optic recording system, an ancillary magnetic field steers the remnant magnetization in one direction or the other while the laser is heating the material above the Curie point. Of interest here is that increases in energy density increase the size of the spot, hence the width and size of the recording. A series of pulses is used for recording short or long pulses, as shown in FIGS. 12 and 13 of this article.

The use of E-beams in semiconductor manufacture is quite well known. For example, see the IBM TECHNICAL DISCLOSURE BULLETIN article, "E-Beam Kinetic Focus for High-Speed Pattern Generation" by Koste, et al., December 1978, Vol. 21, No. 7, pp. 2768–2769. The use of E-beams for thermally recording identification indicia on a semiconductor chip is shown by P. M. Ryan in an article entitled "Automatic Serialization of Chips for Identification and Traceability", IBM TECHNICAL DISCLOSURE BULLETIN, Vol. 22, No. 1, June 1979, pp. 108–111.

European patent No. 45,117 shows examining the light reflected from a video disk for second harmonic content of the carrier frequency used to record the video signal. Control means are disclosed which adjust the recording laser beam power to minimize the second harmonic distortion of the carrier. This system appears applicable to video (analog) recording using a carrier frequency but does not show how to reduce synchronous noise in digital data base-band recording. The shape of any recording signal is not shown in this reference and it is not currently known to applicant.

The Frankfort et al. U.S. Pat. No. 4,562,567 also shows the examination of the light reflected from the optical record member, as in the European patent No. 45,117. FIG. 3C of this latter patent shows a recording beam intensity variation having a high-initial intensity and a reduced-final intensity. This patent teaching requires that the electronic circuits detecting the reflected light and for controlling the laser used to emit a recording beam to be faster than the time period of the shortest data bit to be recorded. This restriction limits the lineal data density of the recording. For example, pulse durations of about ten nanoseconds would not be capable using this latter system. That is, the propagation time of electrical signals through the detector and laser controller circuit plus the response time of solid-state lasers is high. To decrease the response time, the bandwidth of the detector and laser controller could be expanded which results in undesired noise being added to the signal being recorded. It is desired to provide a recording system that can handle recording in the picosecond range.

The above-cited last two references both require a change in reflected light intensity to operate. In recording in most magneto-optic recording media, there is no change in the reflected light intensity; such as found in the known ablative or phase-change recording media. Therefore, it is also desired to find a control system for reducing synchronous noise for magneto-optic media. (Recording in magneto-optic media merely raises the temperature of the recording layer to above the Curie point—destroy the magnetic properties of the media while above the Curie point to enable recording—rather than melting the active layer as in ablative and phase-change optical media.)

SUMMARY OF THE INVENTION

It is an object of this invention to provide thermally-induced recording which substantially reduces synchronous noise in the resultant recording.

In accordance with the invention, a method of recording onto a thermally-responsive record-bearing medium includes the steps of relatively moving the record medium and an energy-beam-emitting pulse source such that the energy-beam-emitting pulse source emits a pulsed energy beam of variable duration to scan a track on the record-bearing medium. A heat-inducing pulse of energy, such as light or other form, is supplied from the energy-beam pulse source to the track being scanned in an area of the track to record information-bearing signals. The pulse shape of the heat-inducing energy pulse is altered from an initial high recording-initiating value to a recording-sustaining value such that the resultant recording in the track is substantially uniform in width along the length of the track being scanned. In this manner, synchronous noise is reduced from a recording made at the recording-initiating value for the duration of the heat-inducing pulse. Various methods and apparatus are included in the invention.

The foregoing and other objects, features, and advantages of the invention will be apparent from the following more particular description of the preferred embodiments of the invention, as illustrated in the accompanying drawings.

DESCRIPTION OF THE PREFERRED EMBODIMENT

Figure 1:
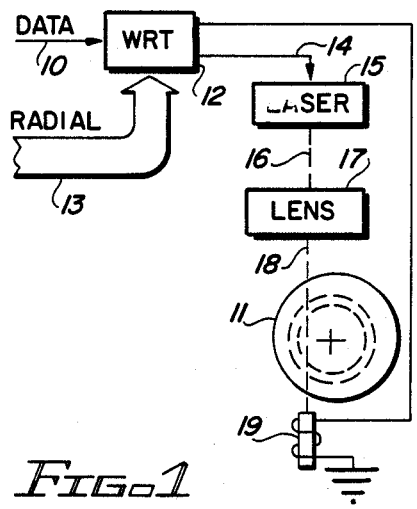
FIG. 1 is a simplified drawing showing an implementation of the invention for use in an optical information-bearing signal recorder.

Referring now more particularly to the drawing, like numerals indicate like parts and structural features in the various diagrams. FIG. 1 illustrates a portion of an optical information-bearing-signal recorder. The arrangements of such recorders are well known in the art and are not detailed for that reason. Magneto-optic recorders are also well known and not detailed for that reason. Examples of the such magneto-optic recorders including both recording employing laser beams and reading recorded information are conveniently found in the March issue of Japan Electronic Engineering (JEE), March 1983 in an article by Nobutake Imamura entitled "Research Applies Magnetic Thin Films and the Magnetooptical Effect in Storage Devices". This article is a survey of such devices, such as the one shown and described in published EPO patent application No. 116,204 (priority U.S. Ser. No. 462,657, Dec. 23, 1982). Both documents are incorporated herein by reference. Data to be recorded as baseband signals are supplied over data line 10 to recording, or write, circuits WRT 12 for recording on rotatable optical-record disk 11, which is an optical thermally-responsive record-bearing medium. In a preferred form, record-bearing medium 11 includes a plurality of radially-displaced circular tracks indicated on disk 11 by two circular dashed lines. The actual configuration of the tracks can be either a plurality of concentric circular tracks or a single spiral track having a plurality of circumvolutions, each circumvolution being termed a single track portion of the spiral track. Assuming that record-bearing medium 11 is rotating at a relatively constant rotational speed, the intensity of the heat-inducing laser beam impinging on record-bearing medium 11 is varied with the radial position of the record track. To achieve this variation in intensity, the track number, which doubles as a radial-position indicator, is supplied over cable 13 to recording circuits 12. Recording circuits 12 generate recording-controlling pulses by combining the radial indicator on cable 13 with the incoming data signals on line 10 to produce a series of control pulses on control line 14 for modulating solid-state laser 15 output-light intensities. Solid-state laser 15 can be any gallium arsenide or other solid-state laser which provides output-light intensities in accordance with diverse input-control amplitude signals, particularly in accordance with a constant-current amplitude. The laser 15 output-light beam follows light-path axis 16 through focusing objective lens 17, then proceeds over light path 18 to disk 11. Omitted from the drawing are the tracking circuits and the track seeking circuits which move beam 18 radially of disk 11 for tracking and seeking, as is well known. The usual focusing circuits are deemed to be shown herein as a part of lens 17, such as are shown in the documents incorporated by reference. A magnetic bias field for magneto-optic recording is generated by the coil assembly 19. Write circuit 12 controls the direction of current flow through coil assembly 19 for determining the direction of the recording bias field at disk 11. Other control and data-transfer circuits are not detailed herein as they are well known.

Figure 2:
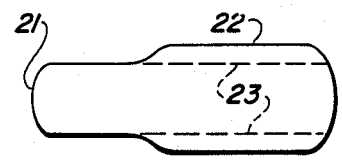
FIG. 2 is a diagrammatic enlarged illustration of a pulse-length recording on a thermally-responsive record-bearing medium showing advantages of practicing the present invention as illustrated in FIG. 1.

FIG. 2 illustrates a typical thermally-induced recording pattern for pulse-length recording as found in ablative recording, phase-change recording, magneto-optic recording, and the like. Pulse-length recording represents information by the length of a recorded pattern; one length is unity, a second length is two, etc. Therefore, a relatively elongated pulse-length-recorded spot 21 represents a plurality of informational units in accordance with the length of the spot 21 along a track on record-bearing medium 11. When a constant-energy, heat-inducing pulse records information into spot 21, the width of the recording area 21 at the onset portion of the recording is at a desired radial width. As the pulse length gets longer, the constant-energy, heat-inducing beam causes the recording area to radially enlarge, as at point 22. The radial enlargement of the recording area results in generation of synchronous noise in the readback signals, as later explained with respect to FIG. 3. If the shape of the recording area 21 can be controlled to that represented by dashed lines 23, the synchronous noise is either eliminated or greatly reduced. The present invention provides a recording area 21 of any desired arbitrary length which substantially eliminates the radial enlargement 22, thereby reducing synchronous noise from the recording induced by recording using a recording-initiating energy intensity.

Figure 3:
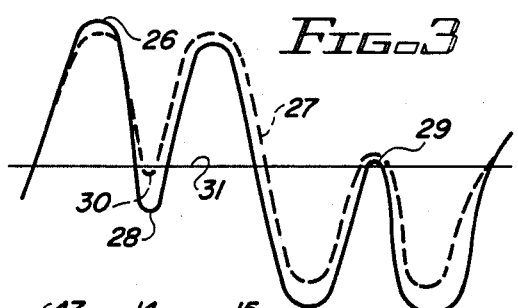
FIG. 3 illustrates readback signals from symmetrical test patterns generated using recordings illustrated in FIG. 2.
Figure 5:
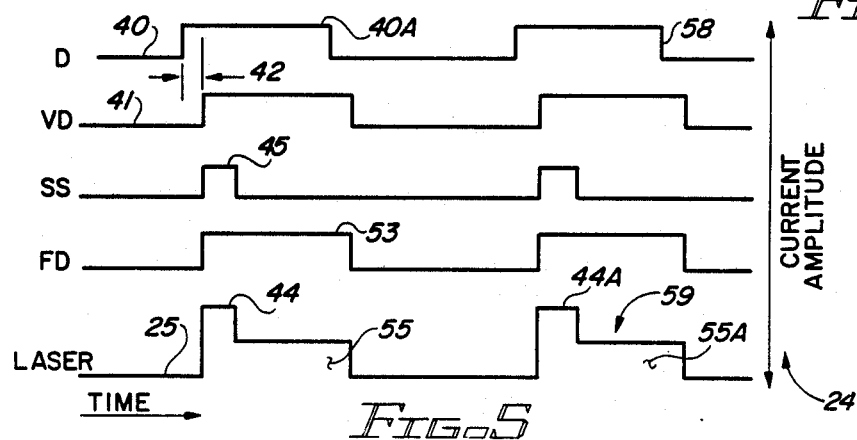
FIG. 5 is a waveform diagram illustrating the operation of the FIG. 4 illustrated circuits and a wave form of an energy pulse usable for thermally inducing recordings.

FIG. 3 is a simplified showing of a test pattern of complementary recording patterns which result in a so-called "M W" read-back pattern and which show synchronous noise effects. Such synchronous noise effects are caused by even harmonics having substantial amplitude with respect to the base-frequency amplitude. The present invention avoids the synchronous-noise problem by supplying a control pulse over line 14 and a resultant light beam having varying intensities with the shape of wave form 25 (FIG. 5). This wave form shows an initial high recording-initiating amplitude, followed by a lower recording-sustaining amplitude in the heat-inducing beam recording information-bearing signals on record-bearing medium 11. Such amplitudes are empirically determined for each type of record medium. The recording-initiating energy level enables high-speed recording—the level quickly heats the recording area to a recording-inducing temperature. The advantages of practicing the present invention, as shown in FIG. 3, can be seen by comparing solid read-back wave form 26, which is read back using constant-amplitude recording-initiating energy-level pulses, while dashed line 27 employs the recording wave form 25. The zero-axis crossing caused by recording long pulses to create read-back wave form 26 dipping well below the zero axis 31, as at point 28, while the read-back signal 27 from the compensated recording using this invention crosses the zero axis 31 at point 30. The signal 27, at point 27, is substantially similar to the zero-axis crossing 29. This similarity indicates a low level or absence of synchronous noise. The waveform 26, having a substantial portion below the zero axis at point 28 and insubstantial zero-axis crossing at point 29, indicates second harmonic distortion or synchronous noise in the readback signal. This read-back signal inferentially indicates that the recording area 21 has a substantial elongated set of parallel sides, as indicated by dashed lines 23.

Figure 4:
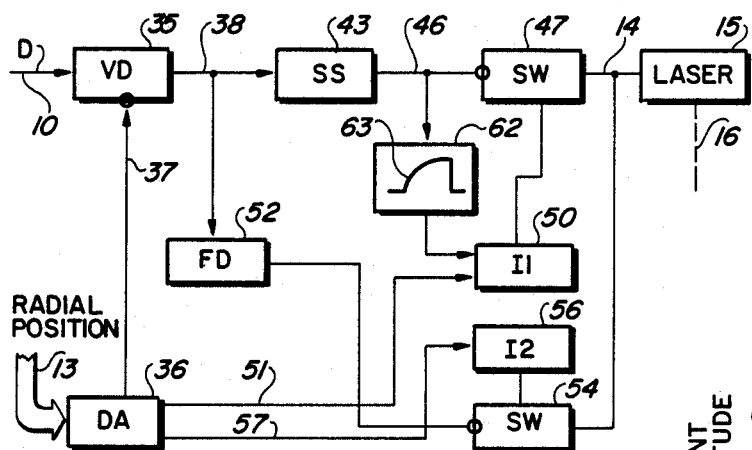
FIG. 4 is a schematic diagram of recording circuits used in the FIG. 1 illustrated recorder.

Generating the compensated recording-light-beam pulse is best understood by referring next to FIGS. 4 and 5. The data input represented by idealized signal 40 is received in variable delay circuit VD 35. Variable-delay circuits are well known and not described for that reason. The radial-position information, i.e., track address, supplied over cable 13 is received by digital-to-analog converter DA 36. The variation in signal delay is controlled by the analog signal supplied over line 37 to VD 35. Generally, the recording signal is delayed with respect to a disk cell (not shown) on the record-bearing medium 11, which delay is varied with radius. The greater the radius, the longer the delay provided to the data signal by VD 35. The output signal 41 of VD 35 on line 38 is variably delayed by amount 42, as above described. The FIG. 4 illustrated circuits have first and second current-control pulse-generating portions respectively indicated as current sources 50, 56. A first portion generates the recording-initiating amplitude 44 (FIG. 5) by adding an output-current pulse from each of the pulse-generating portions, as later described. Single-shot circuit SS 43 (monostable multivibrator) responds to signal 41 to generate an output pulse 45 of constant duration. Pulse 45 travels over control line 46 to actuate electronic switch 47 for passing a constant-amplitude-current pulse received from current source I1 50 to control line 14, thence to laser 15. The output amplitude of current source 50 is controlled by DA 36 supplying a radial-related control signal over line 51. The greater the radial-position indication in cable 13, the greater the amplitude supplied by current source 50.

The second pulse-generating portion supplies a base-current portion 55, generated from signal 41. Signal 41 travels through fixed-delay circuit FD 52, which has a delay equal to the signal-propagation delay of SS 43 such that the leading edges of the current outputs of the two pulse-generating portions are time synchronous. The output signal 53 of FD 52 activates electronic switch 54 to pass a constant-current amplitude from current source I2 56 to line 14, then to laser 15. Signal 53, passed from FD 52, results in generation of base-current portion 55 of wave form 25. Line 14 ohmically interconnects the outputs of switches 47 and 54 for current summing the output of the two switches 47, 54 resulting in wave form 25. The laser 15 outputs a light beam having an energy content and intensity along path 16 with the same shape as the control wave form 25.

Data signal 40 includes a short-duration pulse 58, resulting in an output-control pulse 59, a portion of waveform 25. The recording-initiating portion 44A has the same amplitude and duration as the recording-initiating portion 44 for the longer-duration data pulse. Base portion 55A has a duration representative of the duration of shorter data pulse 58, whereas base portion 55 has a duration representative of the duration of the longer data pulse 40A. The duration of the pulses in waveform 25 represents the information-bearing signals being recorded. In the magneto-optic recording, a first polarity of magnetic remanence represents an absence of a bit-indicating area 21, while the opposite or second polarity of magnetic remanence represents a bit-indicating area 21. In other optical recordings, two surface reflectance levels respectively represent medium background and record area 21.

Figure 6:
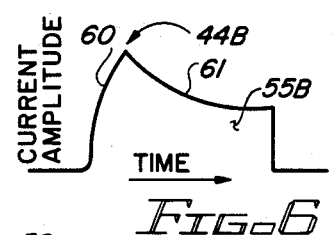
FIG. 6 shows a laser recording pulse shaped to the thermal profile of a recording medium used in the FIG. 1 illustrated recorder.

The shape of recording-initiating portion 44, 44A of wave form 25 can be modified for enhanced recording. While the constant current amplitude shape provides satisfactory noise reduction, further noise reduction is achievable by shaping the recording-initiating portion to the thermal profile of the record medium. Such a profile is empirically determined, as is well known. It is desired to raise the temperature of the recording area as quickly as possible; therefore, the leading edge 60 of pulse portion 44B of FIG. 6 should be as steep as reasonably possible. Once the maximum current amplitude is reached, the shape of pulse portion 44B is the same as the thermal profile of the record medium receiving the recording. This profile typically has an exponential appearance. The trailing portion 61 of pulse portion 44B has a shape determined by the heating characteristic (thermal profile) of the record medium such that the temperature of the recording area is controlled to ensure constant width recording. Trailing pulse edge 61 leads into the recording-sustaining portion 55B of the laser control pulse. The time duration of trailing edge 61 may be longer than the duration of constant-current pulse portions 44 and 44A.

The thermal profile of a record medium is a time measure of the temperature increase of the record medium for a constant-intensity laser beam. The profile of trailing edge 61 corresponds to the temperature increase profile preferably measured (as by infrared sensors) at the central portion of the laser beam image on the record medium. Such a profile can be determined by relatively stationary record medium and laser source, the profile is preferably obtained from a relatively moving record medium and laser source. Once the thermal profile is determined, the usual wave-shaping circuits can be designed to achieve the FIG. 6-illustrated pulse 44B, 55B.

Referring now to FIG. 4, introducing the thermal profile shape to recording-initiating pulse portion 44A is achieved by pulse shaper 62 being actuated by the leading edge of pulse 45 (FIG. 5). Pulse shaper 62 supplies its thermal profile representative control signal 63 to current source 50. Current source 50 responds to the shaper 62 control signal 63 to vary the source 50 supplied current amplitude to switch 47 in accordance with the shaper 62 amplitude. Initially, the current amplitude indicated by the radial-indicating signal supplied by DA 36 over line 57 is supplied by I1 50, then decreasing current amplitudes are supplied following the thermal profile indicated by the pulser 62 control signal 63. The amplitude of control signal 63 is subtracted by I1 50 from the amplitude of the line 51 signal to activate the laser 15 to generate the trailing edge 61 of recording-initiating pulse portion 44B.

While the invention has been particularly shown and described with reference to preferred embodiments thereof, it will be understood by those skilled in the art that various changes in form and details may be made therein without departing from the spirit and scope of the invention. As an example, instead of a single continuous pulse signal, a series of extremely narrow pulses may be used to generate overlapped recordings on the medium which then constitute recording area 21. The amplitude of the pulses in such a series are determined as set forth herein. Such overlapped recording without using the invention also creates synchronous noise in any type of thermo-induced recording.

What is claimed is:

1. In a method of recording information-bearing signals onto a thermally-responsive record-bearing medium;
the steps of:
relatively moving the record-bearing medium and an energy-beam-emitting pulse source such that the source emits a pulsed energy beam to scan a track on the record-bearing medium;
supplying a plurality of heat-inducing pulses of diverse durations for recording the information-bearing signals along the track length as a series of lengths of recordings having lengths corresponding respectively to said diverse durations;
at a predetermined time after initiating each of said heat-inducing pulses, and independently of any portion of said each heat-inducing pulse being reflected from said record medium at said predetermined time, altering the amplitude of each of the heat-inducing pulses from an initial high recording-initiating value to a recording-sustaining value for maintaining the duration of said initial-recording-initiating value at a predetermined fixed duration irrespective of variations in recording lengths caused by said diverse durations, or the light reflected from said record-bearing medium such that the resultant recording in the track is uniformly wide along the length of the track being scanned whereby even-harmonic frequencies are reduced from a recording made at said recording-initiating value for the duration of the heat-inducing pulse.

2. In the method set forth in claim 1, further including the step of keeping the recording-initiating value at a first predetermined constant value and the recording-sustaining value at a second predetermined constant value throughout said track.

3. In the method set forth in claim 2 wherein said record-bearing medium is a circular disk having a plurality of radially spaced-apart tracks disposed about a center of rotation of the disk and wherein the relative movement of the heat source and the record-bearing medium is relative rotation of the disk with respect to the heat source;
further including the steps of:
linearly altering the recording-initiating and recording-sustaining amplitudes with the radius of the disk such that a radially-outmost track has maximal values for both the recording-initiating and recording-sustaining values.

4. In the method set forth in claim 1 wherein said record-bearing medium magneto-optically recorded information-bearing signals;
further including the steps of:
applying a magnetic field to said record-bearing medium in timed relation to said heat-inducing pulse for magnetically orienting the magneto-optic medium in one of two possible magnetic directions such that the length of the recording and the magnetic direction of recording constitute a recorded representation of the information-bearing signals.

5. In the method set forth in claim 1 wherein said record-bearing medium records the information-bearing signals as a phase change of the medium between crystalline and amorphous states;
including the step of:
limiting the recording-initiating value to less than the value required to melt or move recording material in the record-bearing medium.

6. In the method set forth in claim 1 wherein said record-bearing medium records the information-bearing signals as a movement of material in the record-bearing medium;
including the step of:
keeping the recording-initiating value to be greater than that required for thermally inducing said material movement and keeping the recording-sustaining value to be less than that required for said thermally-initiating material movement.

7. In the method set forth in claim 1 wherein said record-bearing medium has a thermal profile, measuring the shape of said thermal profile before supplying said heat-inducing pulses, and then when supplying said heat-inducing pulses shaping each said pulse between said recording-indicating value and said recording-sustaining value to approximate the measured thermal profile of said record-bearing medium.

8. In an information-bearing signal recorder having signal-recording means and means for relatively movably-mounted a thermally-repsonsive record-bearing member;
the improvement in said recording means, comprising:
a variable-energy-beam-emmiting source for emmiting a heat-inducing pulsed beam of energy directed to the record-bearing member for recording information-bearing signals on the record-bearing member and having an energy-controlling input portion;
data means for supplying information-bearing signals to be recorded;

first current-source means connected to said data means for receiving said information-bearing signals and connected to said beam-emitting source for responding to said information-bearing signals for supplying a first control pulse to the beam-emitting source to activate the beam-emitting source to emit said heat-inducing pulsed beam having a first energy level and a fixed-time duration;

second current-source means connected to said data means for receiving said information-bearing signals and connected to said beam-emitting source for responding to said information-bearing signals for supplying a second control pulse to the beam emitting source to activate the beam-emitting source to emit a heat-inducing pulsed beam having a second energy level and of a duration representative of the information-bearing signals and in timed relation to said first energy level such that the first energy level of fixed duration occurs at a beginning first portion of the second-energy-level pulsed beam and such that the two energy levels sum to a recording-initiating value in the overlapping of the first and second control pulses;

a rotatable disk comprising said record-bearing medium and having a plurality of radially-displaced circular record tracks for recording the information-bearing signals; and radial-position-control means for indicating the radial position of a track being scanned by the beam emitted by said beam-emitting source and connected to said data means, to said first current-source means and to said second current-source means and having control means responsive to said radial-position indication to variably delay the operation of the data means such that the current sources are activated at delays from time of receipt of said information-bearing signals in accordance with the indicated radial position and the amplitude values of the control pulses from both said current source vary with the indicated radial position such that a greater radial position results in a higher amplitude-control pulse and resultant greater energy level of emitted heat-inducing pulses.

9. In the information-bearing-signal recorder set forth in claim 8, further comprising:

a solid-state laser comprising said beam-emitting source, said laser responding to variable-amplitude-control current inputs to emit light having an intensity corresponding to the amplitude of the variable-control current and having a single-control input connected to both said current sources whereby electrical currents in the control pulses sum to control the laser-light-output intensity; and the record-bearing medium including a light-responsive layer that induces heat when receiving said laser-light output.

10. In the information-bearing signal recorder set forth in claim 9, further including, in combination:

said record member having a predetermined thermal profile; and signal shaping means in said first current source means for activating the first current source means to supply said first control pulse having a shape approximating said predetermined thermal profile such that said first control pulse has an initial current amplitude for activating the beam-emitting source to emit said first energy level and then to activate the beam-emitting source to change its energy level from said first energy level toward said second energy level at a change in amplitude having a current amplitude profile approximating said predetermined thermal profile.

11. In a magneto-optic data recorder having a controlled laser for emitting a heat-inducing pulse and optics for directing the emitted heat-inducing pulse to a magneto-optic record member, and magnetic means in operative relationships to the record member to magnetically bias the record member at the point of impingement of said heat-inducing pulse on said record member, for recording information-bearing signals on the record member and having means for relatively moving the record member and said laser such that the emitted beam scans a track on the record member;

the improvement including, in combination:

first means for supplying information-bearing data signals to be recorded on the record medium; and second means connected to said first means and to said laser for responding to said supplied data signals to activate said laser to emit respective ones of said heat-inducing pulses each having an initial fixed-duration, recording-inducing-intensity portion followed by a trailing portion having a recording-sustaining amplitude with the total time duration of the two portions being determined by the informational content of the signals being recorded such that the recorded data signals have a constant width along the track being scanned whereby a second harmonic of the data signals is reduced in amplitude.

* * * * *